United States Patent [19]

McDaniel

[11] 4,369,765
[45] Jan. 25, 1983

[54] SUPPLEMENTAL HEATING SYSTEM USING SOLAR RADIATION

[76] Inventor: Grady L. McDaniel, 207 Valley Rd., Lawrenceville, Ga. 30245

[21] Appl. No.: 177,252

[22] Filed: Jun. 11, 1980

[51] Int. Cl.³ .............................................. F24J 3/02
[52] U.S. Cl. .................................. 126/427; 126/429; 165/29; 165/48 S; 219/279
[58] Field of Search ................ 126/427, 99 R, 116 C, 126/429, 428; 165/29, 485; 237/8 R, 53; 219/201, 276, 279

[56] References Cited

U.S. PATENT DOCUMENTS

| | | | |
|---|---|---|---|
| 2,130,606 | 9/1938 | Wanamaker | 219/279 X |
| 2,529,621 | 11/1950 | Mayo | 126/427 X |
| 2,680,565 | 6/1954 | Löf | 126/429 |
| 2,893,639 | 7/1959 | Martin | 126/116 C |
| 2,902,220 | 9/1959 | Myck, Jr. et al. | 165/29 X |
| 3,176,760 | 4/1965 | Murdock | 165/29 |
| 3,994,276 | 11/1976 | Pulver | 126/429 X |
| 4,049,195 | 9/1977 | Rugenstein | 126/429 |
| 4,088,115 | 5/1978 | Powell | 126/429 X |
| 4,298,056 | 11/1981 | Nelson | 165/29 X |

*Primary Examiner*—Larry Jones
*Attorney, Agent, or Firm*—James B. Middleton

[57] ABSTRACT

A heating system for supplementing a conventional furnace or the like is disclosed. The system includes a blower that receives air from the hot air supply system of the conventional furnace, and directs the air through a separate duct to the space to be heated. The present heating system may include solar collectors using air as the heat transfer fluid so that the heat transfer fluid can be directed into the space to be heated. The system also includes one or more low-wattage electric heating elements arranged so that one element is energized when the temperature is slightly below the desired temperature, and additional elements are energized as the temperature falls lower, to maintain the least possible electric energy usage.

8 Claims, 5 Drawing Figures

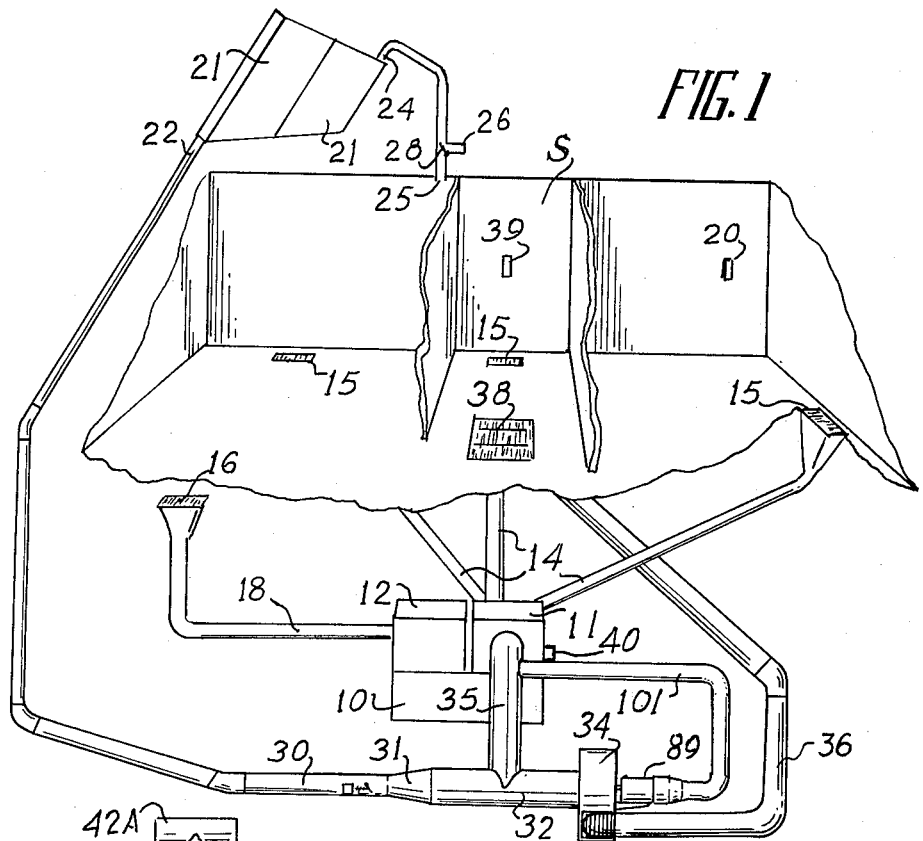
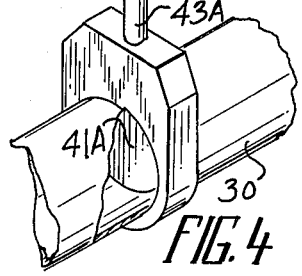
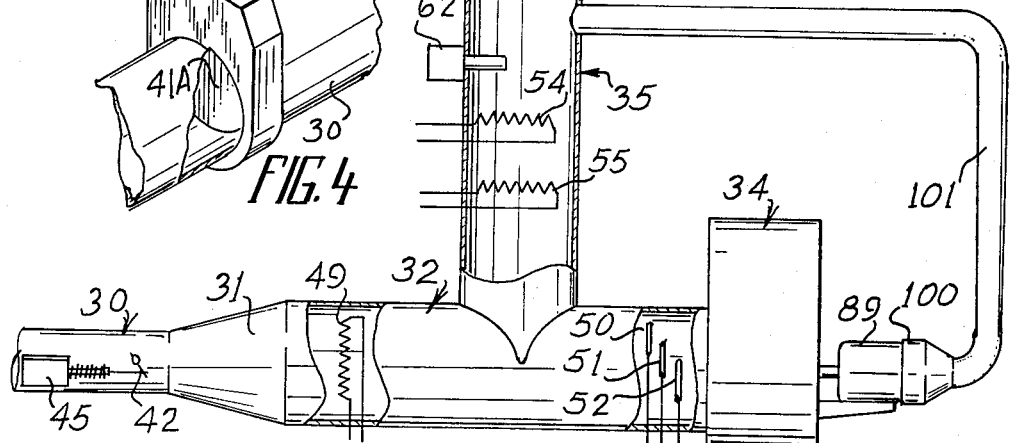

SUPPLEMENTAL HEATING SYSTEM USING SOLAR RADIATION

FIELD OF THE INVENTION

This invention relates generally to supplemental heating systems, and is more particularly concerned with a solar heating system having electric boosters for use in conjunction with a conventional heating system to supplement the conventional heating system.

BACKGROUND OF THE INVENTION

Many varieties of solar heating systems have been developed in an effort to reduce the use of gas, oil, electric and other such heat sources. While systems have been used for water heating, space heating, and the like, the solar heating systems tend to be difficult to install, and somewhat complex. Much of the difficulty with the solar heating systems resides in the fact that most of the systems attempt to rely almost exclusively on solar radiation and require intense radiation. Various storage means have been developed to store excess heat when available for use when solar radiation is not available. Another large difficulty resides in the use of water or other heat transfer liquid, or a refrigerant such as a halogenated hydrocarbon, as the heat transfer medium. The use of a liquid, or a gas under pressure, renders the system difficult and expensive, requiring one to design the system carefully to prevent leaks and protect the system from temperatures outside the operating range of the heat transfer medium utilized.

Some prior art solar heating systems have used electric heating to boost, or supplement, the solar heating system when the required solar radiation was not available, but these systems have used heaters large enough to provide all the desired heat. The advantage of such a system is supposedly that the electric heat would be used at night when the load on the electric utility is minimal. Nevertheless, such a system will use a large amount of electric energy when there is insufficient solar radiation available.

SUMMARY OF THE INVENTION

The system of the present invention overcomes the above mentioned and other difficulties with the prior art solar heating systems by providing a solar heating system designed to supplement an existing, conventional heating system, and to work alternatively to the conventional system. The system of the present invention uses air as the heat transfer medium so the solar heating system can be connected directly to a conventional forced-air heating system without additional heat exchangers or the like. While the system of the present invention uses electric heaters to boost the heat from solar radiation, the electric heaters are very low wattage, and a plurality of separate electric heaters is used so only the required heat may be added without energizing a large heater.

BRIEF DESCRIPTION OF THE DRAWINGS

These and other features and advantages of the present invention will become apparent from consideration of the following specification when taken in conjunction with the accompanying drawings in which:

FIG. 1 is a partially schematic perspective view showing a solar heating system made in accordance with the present invention installed in conjunction with a conventional forced air furnace;

FIG. 2 is an enlarged elevational view, partially in cross-section, showing the air mixing section and electric heaters of the system shown in FIG. 1;

FIG. 3 is a detail showing a valve structure for use in the apparatus of FIG. 2;

FIG. 4 is a perspective view showing an alternate valve arrangement that may be used in the apparatus shown in FIG. 2; and, FIG. 5 is a schematic diagram showing the electric control circuitry for the system shown in FIGS. 1-4.

DESCRIPTION OF AN EMBODIMENT OF THE INVENTION

Figure 5:
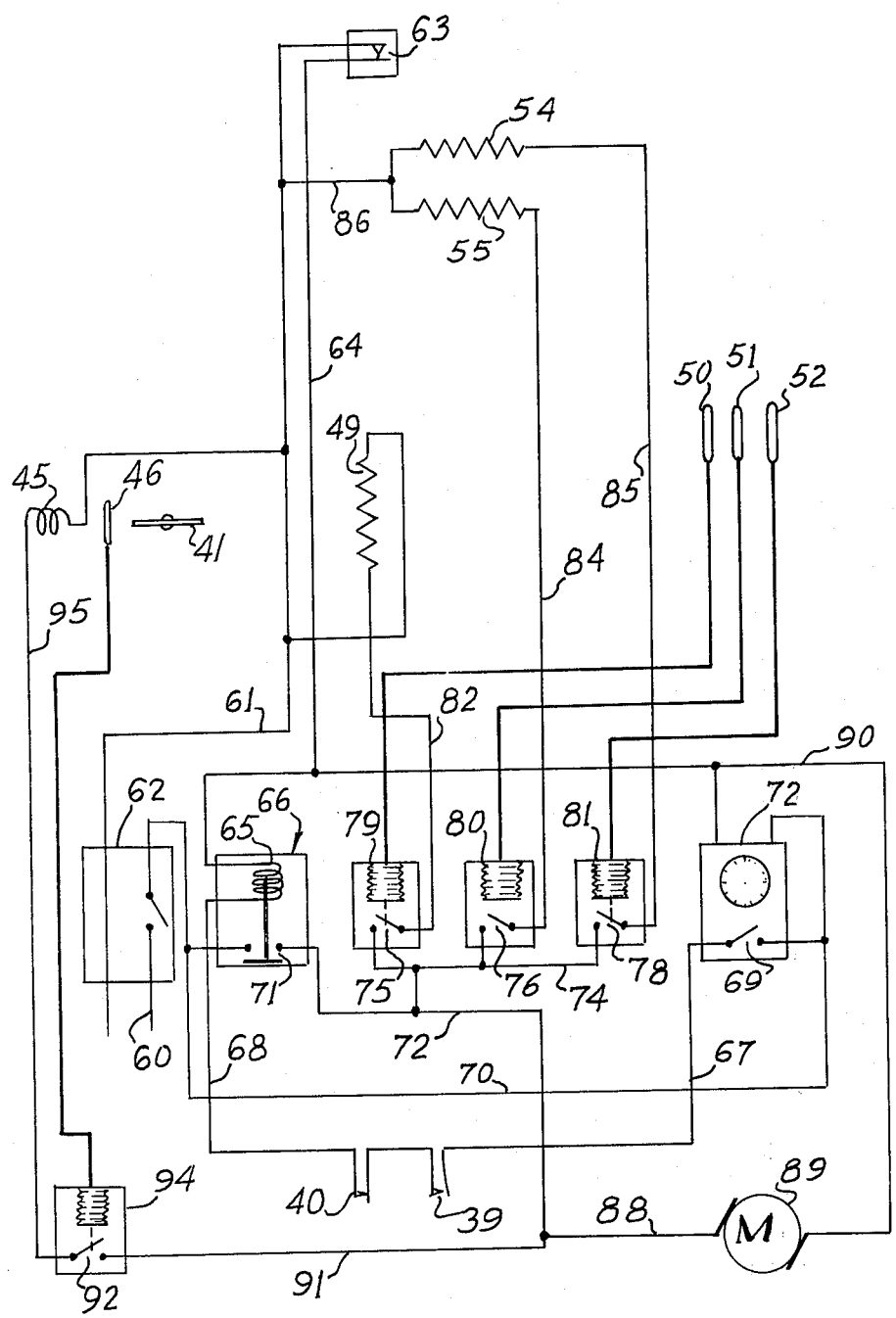

Referring now more particularly to the drawings, and that embodiment of the invention here chosen by way of illustration, it will be seen that FIG. 1 shows a conventional furnace 10 having the hot-air plenum 11 and a return air box 12. A plurality of hot-air supply pipes 14 extend from the plenum 11 to registers 15 within the space S to be heated. It will also be understood by those skilled in the art that a plurality of grilles 16 will be connected by appropriate return air ducts 18 to the box 12.

Thus, in normal operation, the furnace 10 will be heated, causing the temperature in the plenum 11 to rise to a predetermined point; then, a blower will be energized to circulate air from the plenum 11, through the pipes 14 and registers 15, then into the grilles 16, ducts 18 and back to the box 12 and furnace 10.

As is conventional, a thermostat 20 is located in the space S to determine when the space needs to be heated, the thermostat 20 operating the burner or other heating means within the furnace 10.

Solar panels 21 are shown schematically in FIG. 1 of the drawings. The present invention does not require any specific design for the solar panels 21, the only requirement being that the panels use air as the heat transfer medium. The panel 21 is shown as having an exit 22 for the heated air, and an entrance 24 for the air to be heated.

The entrance 24 is connected to a pipe 25 which communicates with the space S. The pipe 25 also includes a nipple 26 which opens to the atmosphere. A damper 28 can be moved to allow all air from the space S, all air from the outside, or any combination, thereby allowing any desired amount of fresh air to be mixed with the recirculated air. Obviously, conventional filter arrangements can be used to remove dust from the air before heating.

The exit 22 from the solar panel 21 is connected to the duct 30 within the building. This duct 30 connects to a transition piece 31, then to a large duct 32. The duct 32 is connected to the suction side of a blower 34. It should be noted that the blower 34 is a separate blower from the blower built into the furnace 10.

The duct 32 has a branch duct 35 connected to the plenum 11 of the furnace 10. Thus, the input to the blower 34 comes from the solar panels 21 and from the plenum 11. The output from the blower 34, in the embodiment of the invention here chosen by way of illustration, is directed through a single duct 36 to a large grille 38 within the space S. Since the solar heating system is separate from the conventional heating system, a separate thermostat 39 is located within the space S to control the system.

From the foregoing, it should now be understood generally that the solar heating system will operate only when the furnace 10 is not operating. A thermostat 40 will detect a high temperature in the plenum 11 to determine when the furnace 10 is operating and to turn off the solar heating system.

When the solar heating system is operating, the blower 34 will draw air through the duct 32 and supply air through the grille 38. Air is supplied to the duct 32 from the plenum 11 and from the pipe 30 which brings air from the solar panels 21. It will therefore be seen that the solar heating system utilizes the duct-work of the conventional heating system, but operates it in reverse. The registers 15 are used for return air, and the air is pulled through the plenum, through the duct 35 and into the duct 32. The air is then mixed with heated air from the solar panel 21 and directed back into the space S.

Because of the arrangement described, when the furnace 10 is operating so that its blower places air into the plenum 11, any air that is moved through the system of the present invention will pass through the branch duct 35, into the duct 32, and back through the duct 36 to the grille 38 and into the space S. Thus, there will be no wasted heat because of the present system.

Furthermore, when the system of the present invention is operating, any heated air remaining in the supply pipes 14 will be pulled into the plenum 11, into the branch duct 35, then into the duct 32 to be returned to the space S. Again, there will be no wasted heat using the present system.

Attention is now directed to FIGS. 2 and 3 of the drawings for a better understanding of the operation of the solar heating system of the present invention.

In FIGS. 2 and 3 it will be seen that the pipe 30 includes a valve arrangement in the form of a damper 41. The damper 41 is pivotal on a rod 43 so the damper can pivot from the closed position as shown to an open position wherein the damper 41 extends parallel to air flow. This is conventional and should be well understood by those skilled in the art.

For operating the damper 41, the rod 43 is provided with a crank arm 42. The arm 42 receives a connecting rod 44 which is also connected to the armature 47 of a solenoid 45. Thus, when the solenoid 45 is energized, the armature 47 will be retracted and the crank arm 42 will be moved to rotate the damper 41 to its full-open position. When the solenoid 45 is deenergized, the spring 53 bears against the stop 57 to urge the armature 47 to the position shown in the drawings.

Immediately before the damper 41, there is a temperature sensing device 46 positioned to detect the temperature of the air coming from the solar panels 21. Since there must be air flow through the pipe 30 for the device 46 to sense the temperature of the air in the solar panels 21, the damper 41 is provided with a small aperture 48 to allow some air flow even when the damper 41 is closed. Alternatively, of course, the damper 41 may be adjusted so that it never fully closes, the only requirement being that some air flow is allowed when the damper is closed.

It will therefore be understood that, when the incoming air from the solar panel 21 is below a predetermined temperature, the sensing device 46 will activate the control to deenergize the solenoid 45 and allow the spring 53 to move the damper 41 to its closed position. When the device 46 senses air at or above the predetermined temperature, assuming the solar system is operating, the control will be operated to energize the solenoid 45 and open the damper 41.

FIG. 4 illustrates a different form of valve for use in lieu of the damper 41. This device is essentially a gate valve having the gate 41A carried by an operating stem 43A. The device shown in FIG. 4 is to be used as a less expensive valve arrangement, and is simply operated by hand using the handle 42A. Thus, the controls are eliminated to reduce the cost, but the operation of the overall system remains the same as previously described.

Within the duct 32 and just beyond the transition piece 31, there is an electrical heating element shown schematically and indicated at 49. While the precise structure of the heating element 49 is not shown, those skilled in the art will readily understand how the device is to be constructed from the discussion hereinafter. From the showing in FIG. 2 of the drawings it will be seen that the heating element 49 will heat the air coming from the solar panel 21 when the element 49 is energized. The element 49 is so placed that the air from the solar panel will be heated before being mixed with the return air from the space S.

Within the duct 32, and beyond the junction with the duct 35, there are three sensors 50, 51 and 52. These sensors are shown schematically and spaced apart within the duct 32; however, it will be understood that the intent is that the three sensors are generally in the same location, the spacing being for purposes of illustration only. The three sensors will therefore detect the temperature of generally the same air, but each sensor controls a different component.

The sensor 50 is connected to a device through which the element 49 is controlled, to be energized or deenergized. Similarly, the sensor 51 controls the heating element 54 within the duct 35, and the sensor 52 controls the heating element 55 within the duct 35. As will be discussed more fully hereinafter, the three heating elements are energized at different temperatures so that, if only one element will raise the temperature sufficiently to meet the demands of the thermostat 39, very little electrical energy will be used. Only when the first element is insufficient will the second element be energized, and only if the first two are insufficient will the third be energized. Thus, the electrical energy usage is maintained as low as possible to have the heat desired.

As long as the solar heating system of the present invention is in operation, the blower 34 is operating, so the motor 89 for the blower 34 is energized. It will be recognized that the blower motor 89 will generally be from one-fifth horsepower to one-half horsepower for most residential structures, or from about 150 to 375 watts. Since there are losses in an electric motor, and these losses are reflected in heat production, the present system puts the heat into the heating system.

As is shown in FIGS. 1 and 2, the motor 89 has a cowl 100 at the rear thereof. The cowl 100 is connected to a pipe 101, and the pipe 101 is connected to the duct 35. Thus, air will flow into the front of the motor 89, pass through the motor 89 for cooling as is conventional, then flow into the cowl 100 and through the pipe 101. It will be understood by those skilled in the art that the motor 89 will have its own fan to assist in moving air through the motor, and there will be low pressure within the duct 35 because of the blower 34, so air will move through the motor 89 and into the duct 35.

Attention is now directed to FIG. 5 of the drawings for an understanding of the complete control circuit of the apparatus disclosed. Here it will be seen that electric power will be supplied from the conventional electrical panel, there being here illustrated a hot line 60 and a ground line 61. Also, there is illustrated a box 62 which can be used to isolate the device as well as to provide overload protection. Such equipment is conventional and no further description is thought to be necessary.

There is a high temperature safety switch in the duct 35, this being conventional on heating systems to deenergize the system in case of over heating. The sensor and switch device are illustrated at 63. It will be seen that the ground line 61 is connected through the box 62 to the device 63; and, a line 64 is connected from the device 63 to the coil 65 in a contactor, or relay, 66. The opposite side of the coil 65 is connected through a wire 68 through the thermostat 40, then through the thermostat 39, through wire 67 to a switch 69. The opposite side of the switch 69 is connected through a wire 70 to the hot line 60.

Thus, when the switch 63 is closed (which is usual), and the switch 69 is closed, the relay coil 65 will be energized by closing the thermostatic switch 39, it being realized that the thermostatic switch 40 will normally be closed.

The switch 69 is a switch within a time clock 72, and the time clock 72 is conventional and well understood in the art. The clock 72 can be set as desired to cause the switch 69 to be opened and closed at preset times. Thus, the time clock 72 can be set to allow operation of the system between predetermined hours as will be discussed further below.

The hot line 60 is connected through the box 62 to the switch 71 of the relay 66. The opposite side of the switch 71 is connected through a line 72 to a bus 74 and to a line 88. The line 88 is connected to the motor 89 of the blower 34 so that, when the relay 66 is energized the blower 34 will operate. The bus 74 provides power to the heating elements and their controls.

From the bus 74, there are leads to three switches 75, 76 and 78, which are the switch contacts in the temperature control equipment. The control devices designated at 79, 80 and 81 are conventional devices utilizing a bulb, which constitutes the sensors 50, 51 and 52, a tube connected to the bulb, and a bellows. The general arrangement is such that a gas in the system expands and contracts with variations in temperature, causing the bellows to expand and contract, and the associated switch is opened or closed at a predetermined temperature.

It will be recognized that the particular form of temperature controller works quite well in the apparatus of the present invention, but other controls may operate as well, and the present invention is not limited to use of the particular type herein discussed.

From the switch 75, a wire 82 is connected to the heating element 49. It will be seen that the opposite side of the element 49 is connected to the ground wire 61, so closing of the switch 75 connects the element 49 between ground and the bus 74. Similarly, a wire 84 connects the switch 76 to the element 54, and a wire 85 connects the switch 78 to the element 55. The elements 54 and 55 are also connected to ground through the wire 86.

Since the wire 70 is connected to the hot line 60, a branch can be connected to the time clock 72 to operate the timer motor of the time clock. The ground side is connected from a wire 90 which is connected to the wire 64, and leads also to the opposite side of the motor 89.

There is a control 94 that is the control unit for the sensor 46. It will be seen that, when the switch 92 in the control 94 is closed, power is fed from the wire 72, through the line 91, then through the switch and through the wire 95 to the solenoid 45. The opposite side of the solenoid 45 is connected to ground 61.

From the foregoing description, operation of the device should now be understandable. First, the time clock 72 will be provided with power as described so the clock will run continuously. Next, the time clock 72 will be set to close the switch 69 approximately during the daylight hours, and preferably from about an hour before sunrise until an hour after sunset. While the particular hours will vary depending on season, geographical location, personal wishes, the object is to obtain and utilize the maximum amount of solar energy.

Since the coil 65 of the relay 66 is energized through the switch 69, the entire system is deenergized when the switch 69 is open; but, when the time clock 72 closes the switch 69, the coil 65 will be energized to close the switch 71, subject to the condition of the thermostats 39 and 40. The switch in the thermostat 40 is a normally closed switch that opens when a predetermined temperature is reached, and the switch in the thermostat 39 is a normally open switch that will close when the space S needs heat. Thus, unless the plenum 11 is hot, indicating that the furnace 10 is operating, the coil 65 will be energized when the space S needs heat and the switch 69 is closed.

If the space S requires heating, the switch in the thermostat 39 will be closed. Also, the bus 74 will be energized to allow energization of one or more of the heating elements 49, 54 and 55 as dictated by the controls 79, 80 and 81.

When the switch 71 is closed power is also placed on the wire 91 to the control 94. If the sensor 46 indicates that the temperature of the air flowing through the panels 21 is sufficiently warm to raise the temperature within the space S, the switch 92 will be open so the solenoid is deenergized, and the spring 53 will open the damper 41. If the heat from the panels 21 is sufficient, the system will operate in this manner until the thermostat 39 indicates that the space S is sufficiently heated, opens, and turns off the system.

While the blower 34 is operating, it will be remembered that the sensors 50, 51 and 52 are monitoring the temperature of the air before the air is supplied to the space S. If the temperature of this air falls below a first temperature, the control 81 will close its switch 78 to energize the heating element 54. In this case, a small amount of heat is added to the air. If the temperature falls below a second temperature, which is lower than the first, the control 80 will close its switch 76 to energize the heating element 55, thereby adding more heat to the circulated air. And, if the temperature falls below a third temperature, which is lower than the second, the control 79 will close its switch 75 to energize the element 49. This is the maximum electrical heating system will use, apart from the heat from the motor 89 as was previously discussed.

In the event the use of all three heating elements plus the solar panels 21 does not produce enough heat to heat the space S, the thermostat 20 will close to start the furnace 10. When the plenum 11 is heated, the thermostat 40 will open the switch and deenergize the coil 65, causing the switch 71 to open and prevent further operation of the solar heating system.

In using a system constructed in accordance with the present invention, it should be understood that the object is simply to supplement the heat provided by a conventional heating system; however, because the solar heating system is not depended on for the majority of the heat, such a system can be used to economic advantage in areas where a full solar heating system would be impracticable. Also, the system of the present invention utilizes the concept of providing a small amount of heat when the temperature drops only slightly so there is no need for massive energy input from the system.

It will of course be recognized that, in full sun, the solar panels 21 will provide enough heat that no boosting by the electric heating elements will be needed. The present system, however, contemplates use of the solar panels 21 even on cloudy or overcast days, and early in the morning and late in the evening when the solar radiation is minimal and some boosting of the heat may be required.

As was previously stated, the electric heating elements 49, 54 and 55 are very low wattage, and are energized one-by-one only as heat is required by the space S so electric energy usage is very low.

Further to illustrate the invention, the following example is provided of one successful installation utilizing the present invention. It will be understood that the example is illustrative only, and is not intended in any way to limit the invention.

The conventional furnace 10 is controlled by the thermostat 20, and the thermostat 20 is set at 65° (18° C.). The control 81 is set at 72° F. (22° C.), and the thermostat 39 is set at 74° F. (23° C.). Thus, when the time clock 72 closes the switch 69, and the thermostat 39 indicates that the space S needs heat, the control 81 will close the switch 78 to energize the element 55.

The element 55, as are the elements 54 and 49, is rated at 450 watts, 115 VAC. The elements are designed to get hot, but remain black rather than be heated to a red or hotter. Those skilled in the art will understand that an element that gets red converts electric energy into radiant heat, and within an air duct as in the present invention there is no means for utilizing the radiant heat. Therefore, the black element is preferred, so heat is transferred to the air by conduction and the transfer is more efficient.

It will be understood that, when the element 55 is energized, one would usually expect that the temperature is only slightly lower than is desired, so the one element may boost the heat sufficiently. Since the element is rated at 450 watts, the heat output should be about 1535 BTU/Hr. (385 Kg-Cal/Hr) and as the temperature falls further, the control 80 will close its switch 76 to energize the element 54, the control 80 being set at 70° F. (21° C.). The heat output will thus be doubled.

The final control 79 is set at 65° F. (18° C.), and when the temperature is in this range, all three of the elements 49, 54 and 55 will be energized, for a total wattage of 1350, and a total heat output of about 4,600 BTU/Hr (1160 Kg-Cal/Hr).

So long as there is sufficient solar radiation falling on the panels 21 to maintain a temperature of at least 67°-70° F. (19°-21° C.), the switch 92 will be closed, the damper 41 will be open, and the solar panels 21 will contribute to the heat. It will be realized that the 1350 watts of electric heat cannot heat a house by itself, but used as above described to boost the solar heat, it has been found that the conventional furnace 10 operates very little during sunshine hours, and the electric energy used by the elements 49, 54 and 55, plus the motor 89, is low enough that there is a very large economic advantage to the present system.

It has been found in operating the above described system that the controls 79, 80 and 81 should have an accuracy of only about 18-20%. This causes the elements to turn on only when the temperature is low, and the elements stay on until the temperature is high, so there is overlapping of operation of the heating elements which yields excellent results.

It will of course be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as defined in the appended claims.

I claim:

1. A supplemental heating system, for use with a conventional heating system including a furnace, a plenum carried by said furnace for receiving air heated by said furnace, supply ducts in communication with said plenum for distributing said air to a space to be heated, and a furnace thermostat in said space for causing said furnace to operate when said space is below a predetermined temperature, said supplemental heating system including a blower having a low pressure side and a high pressure side, a first duct in communication with said low pressure side, a branch duct in communication with said plenum and said first duct, means connecting said high pressure side of said blower to said space to be heated, supplemental heating means for supplying heat to said first duct, timing means for determining periods of possible operation of said supplemental heating system, and thermostatic means for disabling said supplemental heating means when the temperature of said plenum is above a predetermined temperature, the arrangement being such that, during a period of possible operation of said supplemental heating system said furnace will operate in accordance with said furnace thermostat and said supplemental heating system will warm said space so long as sufficient heat is available through said supplemental heating system, said blower of said supplemental heating system removing heated air from said plenum and said supply ducts for distribution through said supplemental heating system.

2. A supplemental heating system as claimed in claim 1, said supplemental heating means including an external heat source and an internal heat source, valve means for isolating said external heat source when said external heat source is below a predetermined temperature, and control means for controlling said internal heat source.

3. A supplemental heating system as claimed in claim 2, said external heat source comprising solar radiation collectors having an air passage therethrough, and a pipe connecting said air passage to said first duct, said valve means comprising a damper within said pipe.

4. A supplemental heating system as claimed in claim 3, and further including temperature sensing means between said solar radiation collectors and said damper, and second control means for opening said damper when the temperature at said damper is above a predetermined temperature.

5. A supplemental heating system as claimed in claim 4, said temperature sensing means being adjacent to said damper, said damper defining an aperture therein to allow air flow when said damper is closed.

6. A supplemental heating system as claimed in claim 5, said internal heat source comprising at least one electric heating element, a temperature sensor for detecting the temperature of air at said low pressure side of said blower, and control means for energizing said at least one electric heating element when said air at said low pressure side is below a predetermined temperature.

7. A supplemental heating system as claimed in claim 5, said internal heat source including a plurality of low wattage electric heating elements, a plurality of temperature sensors for detecting the temperature of air generally at said low pressure side of said blower, and a plurality of control means for selectively energizing said plurality of heating elements, the arrangement being such that each sensor of said plurality of sensors is operably connected with one control means of said plurality of control means to energize one heating element of said plurality of heating elements.

8. A supplemental heating system as claimed in claim 7, and further including temperature sensitive means in series with said timing means for indicating when said supplemental heating system is needed to heat said space to be heated, an electric motor for operating said blower, and heat recovery means for directing heat from said electric motor to said branch duct.

* * * * *